(12) United States Patent
Ruggiero et al.

(10) Patent No.: US 12,078,357 B2
(45) Date of Patent: Sep. 3, 2024

(54) ROTATING DETONATION-ENABLED AUGMENTOR SYSTEMS

(71) Applicant: General Electric Company, Schenectady, NY (US)

(72) Inventors: Eric J. Ruggiero, West Chester, OH (US); Aaron J. Glaser, Cincinnati, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 18/078,889

(22) Filed: Dec. 9, 2022

(65) Prior Publication Data

US 2024/0191876 A1    Jun. 13, 2024

(51) Int. Cl.
*F23R 7/00* (2006.01)
*F02C 5/02* (2006.01)

(52) U.S. Cl.
CPC ............... *F23R 7/00* (2013.01); *F02C 5/02* (2013.01); *F05D 2240/35* (2013.01)

(58) Field of Classification Search
CPC ..... F02C 5/02; F02K 3/10; F02K 7/02; F02K 7/04; F02K 7/08; F23R 3/18; F23R 3/20; F23R 3/42; F23R 3/44; F23R 7/00
See application file for complete search history.

(56) References Cited

U.S. PATENT DOCUMENTS

| | | | |
|---|---|---|---|
| 2,670,597 A | 3/1954 | Villemejane |
| 2,750,733 A | 6/1956 | Paris |
| 2,942,412 A | 6/1960 | Bollay |
| 6,442,930 B1 | 9/2002 | Johnson |
| 6,460,342 B1 | 10/2002 | Nalim |
| 6,666,018 B2 | 12/2003 | Butler |
| 6,877,310 B2 | 4/2005 | Leyva |
| 6,883,304 B2 | 4/2005 | Ouellette |
| 7,621,118 B2 | 11/2009 | Snyder |
| 8,117,828 B2 | 2/2012 | Snyder |
| 10,151,271 B2 | 12/2018 | Hill |

(Continued)

FOREIGN PATENT DOCUMENTS

WO    2012092285    7/2012

*Primary Examiner* — Scott J Walthour
(74) *Attorney, Agent, or Firm* — Fitch, Even, Tabin & Flannery, LLP

(57) ABSTRACT

Systems and methods are provided herein useful to thrust augmentation in a gas turbine engine. In some embodiments, the systems include augmentors that incorporate a rotating detonation architecture. An exhaust system of a gas turbine engine includes an augmentor and a peripheral wall surrounding an exhaust system core. The augmentor comprises a detonation chamber disposed within the exhaust system core. The detonation chamber includes a channel formed in the peripheral wall. A core inlet path delivers a core air-fuel mixture and a pilot inlet path delivers a pilot air-fuel mixture to the detonation chamber. The core air-fuel mixture combusts in the detonation chamber along the midline the detonation chamber. The pilot air-fuel mixture detonates in the detonation chamber adjacent the peripheral wall to create a rotating detonation wave that supports the combustion reaction occurring along the midline of the detonation chamber.

18 Claims, 8 Drawing Sheets

(56) References Cited

U.S. PATENT DOCUMENTS

| | | | |
|---|---|---|---|
| 2007/0044476 A1* | 3/2007 | Koshoffer | F23R 3/20 |
| | | | 60/776 |
| 2009/0056340 A1* | 3/2009 | Woltmann | F23R 3/12 |
| | | | 60/765 |
| 2018/0038589 A1 | 2/2018 | Karkow | |
| 2018/0180289 A1 | 6/2018 | Lavertu, Jr. | |
| 2018/0274787 A1 | 9/2018 | Greene | |
| 2018/0355822 A1 | 12/2018 | Vise | |
| 2019/0093880 A1 | 3/2019 | Juan | |
| 2019/0212009 A1* | 7/2019 | Boardman | F23R 3/58 |
| 2019/0264920 A1 | 8/2019 | Pal | |
| 2020/0063968 A1 | 2/2020 | Gutmark | |
| 2020/0149496 A1 | 5/2020 | Singh | |

* cited by examiner

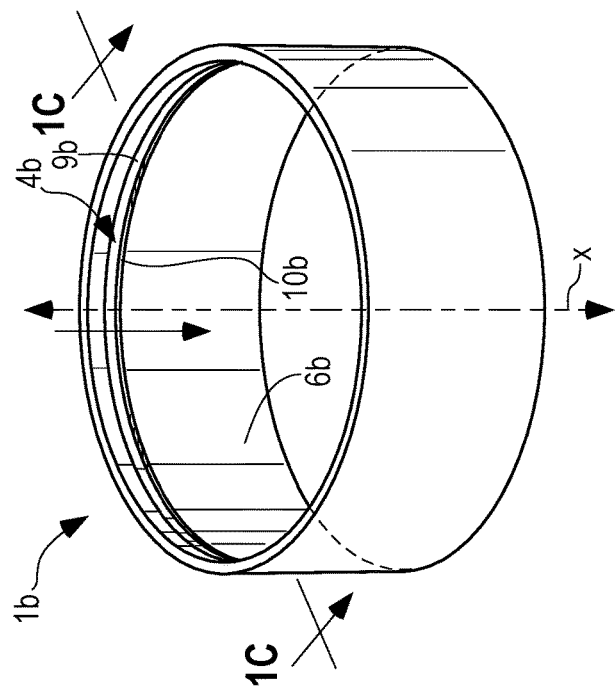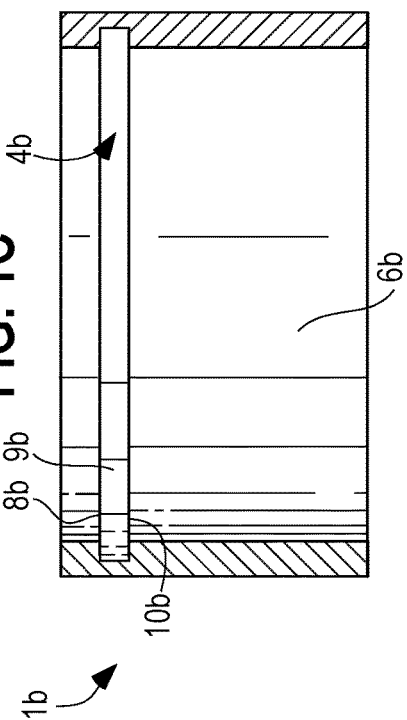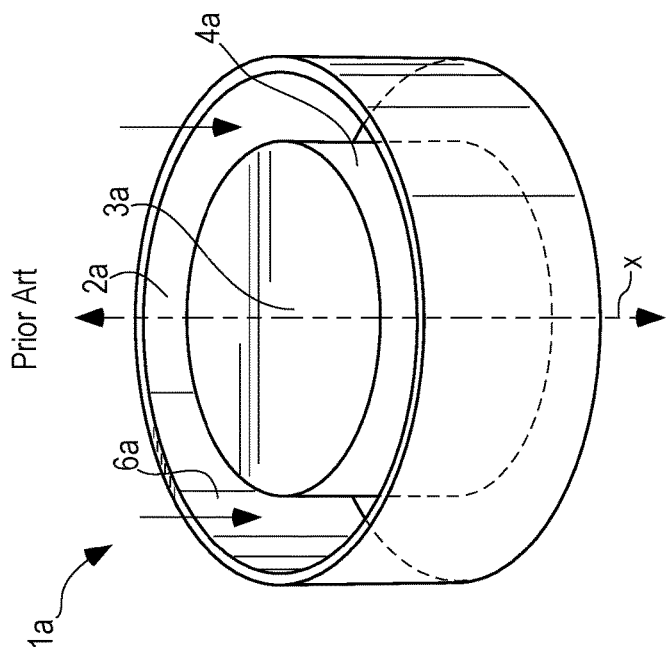

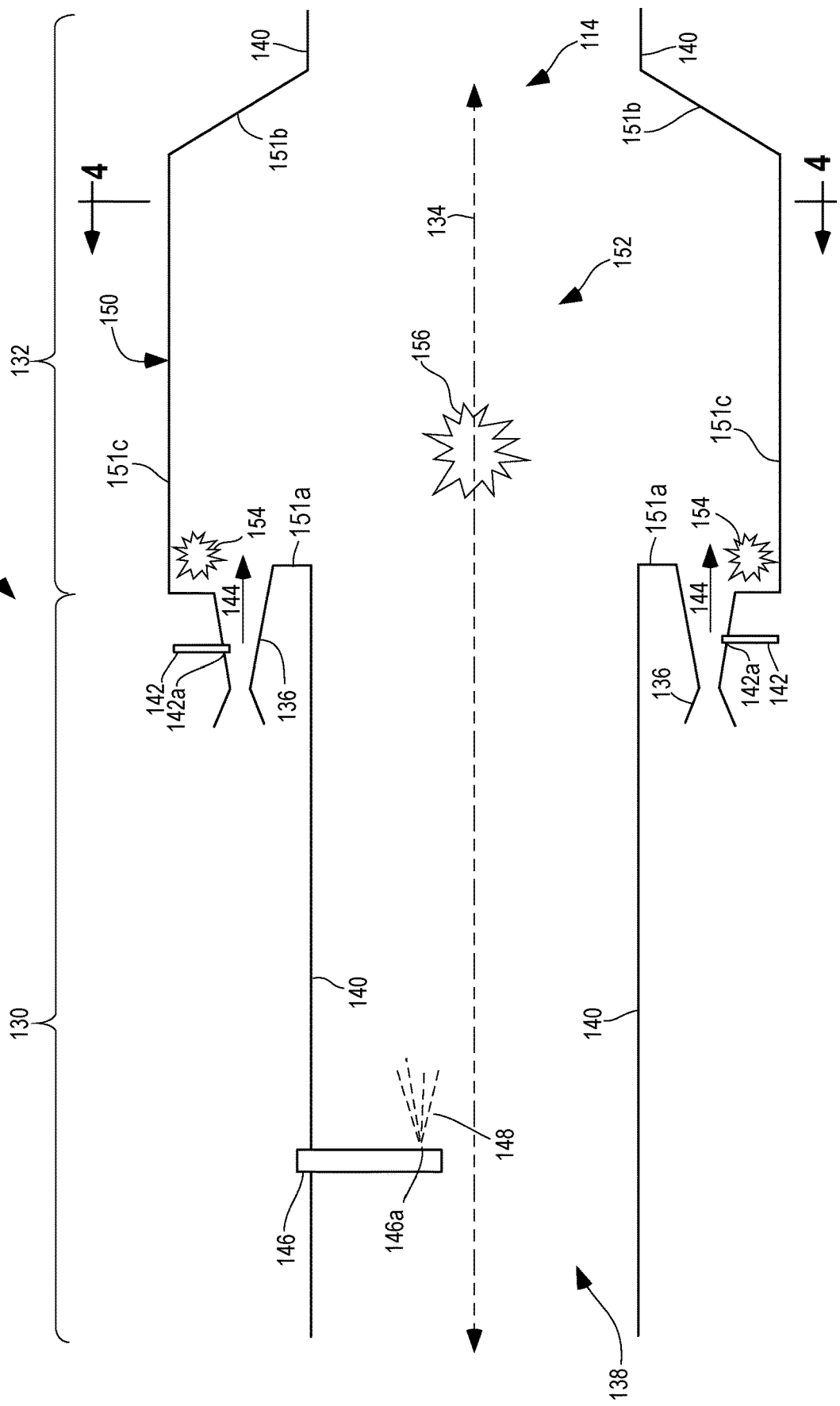

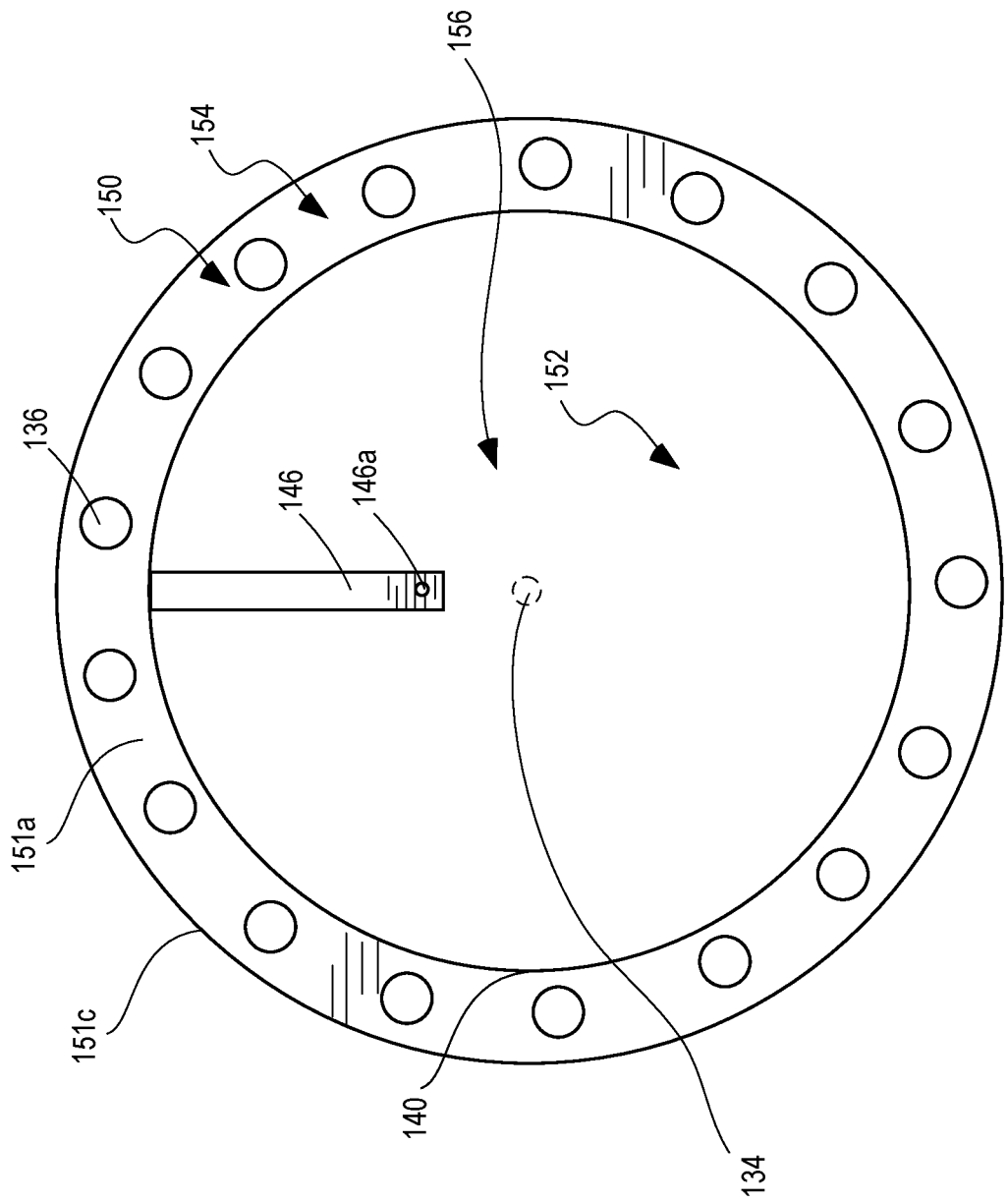

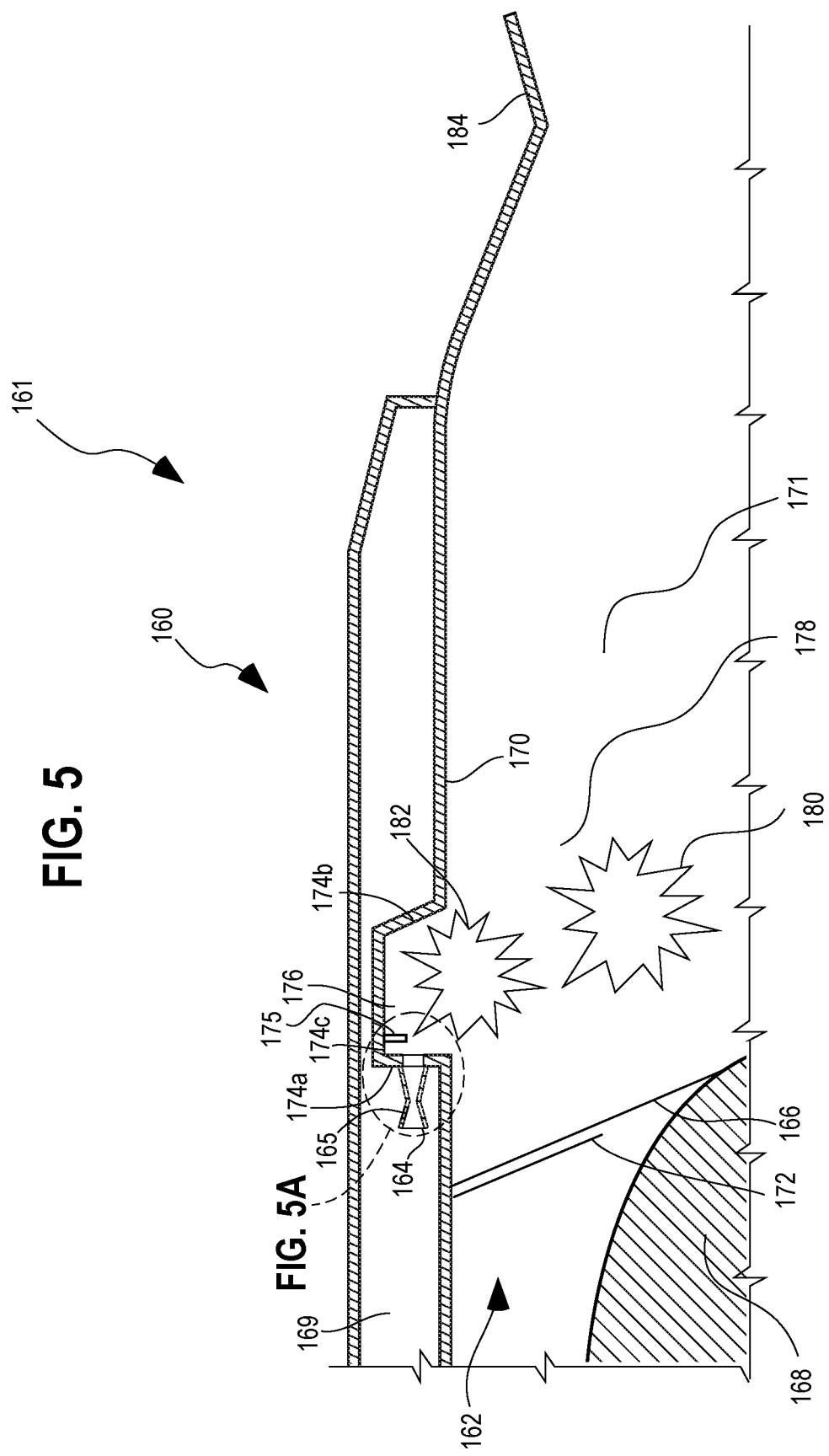

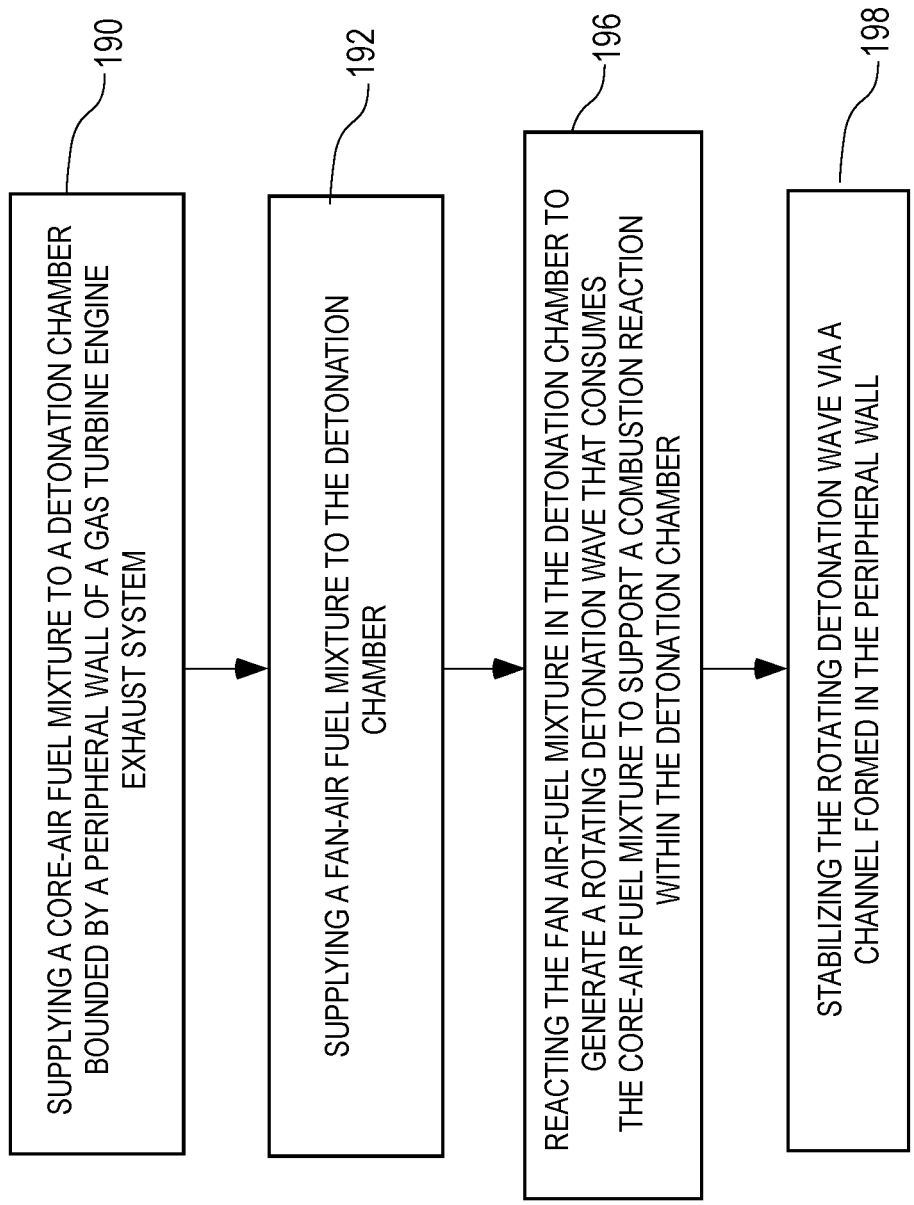

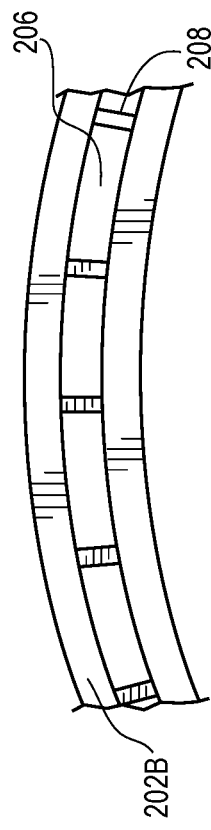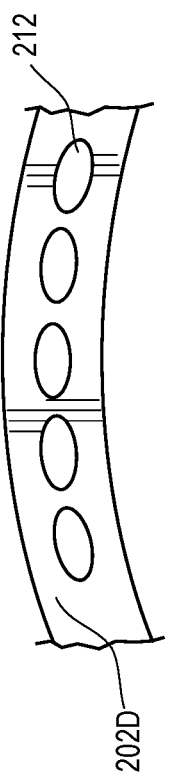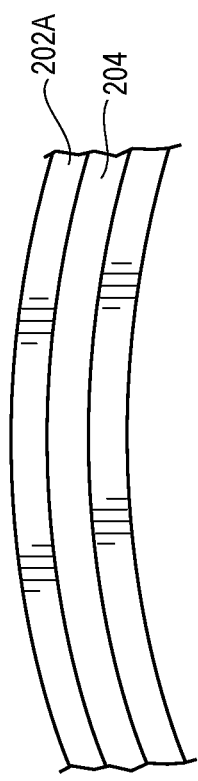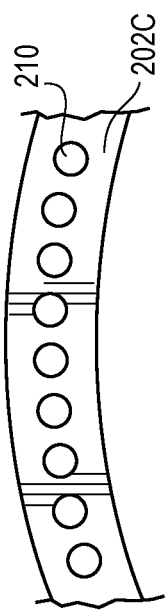

US 12,078,357 B2

ROTATING DETONATION-ENABLED AUGMENTOR SYSTEMS

TECHNICAL FIELD

These teachings relate generally to gas turbine engines and, more specifically, to augmentor systems for gas turbine engines.

BACKGROUND

A gas turbine engine generally includes a core engine system and an exhaust system. The core engine system includes the engine turbomachinery while the exhaust system includes an exit nozzle that produces thrust. In certain high-performance gas turbine engines, the exhaust system may incorporate an augmentor, also known as an afterburner. The augmentor is typically located at the end of the engine turbomachinery in a duct upstream of the exit nozzle. In operation, the augmentor may provide additional heat to the exhaust airflow exiting the core engine system to increase engine thrust. Incorporating an augmentor into a gas turbine engine may add additional axial length and volume, in particular, to an exhaust system of the gas turbine engine. The increase in axial length and volume also increases the weight of the gas turbine engine which further results in increased fuel consumption.

BRIEF DESCRIPTION OF THE DRAWINGS

Various needs are at least partially met through provision of the rotating detonation-enabled augmentor systems described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which:

FIG. 1A comprises a schematic diagram of a typical rotating detonation architecture;

FIGS. 1B, and 1C comprise schematic diagrams of a rotating detonation architecture in accordance with various embodiments of these teachings;

FIG. 3 comprises a schematic cross-sectional diagram of the augmentor of FIG. 2 as configured in accordance with various embodiments of these teachings;

FIG. 4 comprises a schematic cross-sectional view of the detonation chamber of the augmentor of FIG. 3, taken along line 4-4 of FIG. 3, as configured in accordance with various embodiments of these teachings;

FIG. 5 comprises a cross-sectional side elevation view of a portion of an augmentor system as configured in accordance with various embodiments of these teachings;

FIG. 6 comprises a flow chart of a method of for thrust augmentation in a gas turbine engine in accordance with various embodiments of these teachings;

FIGS. 7A, 7B, 7C, and 7D are schematic forward-looking aft-end views of a portion of exemplary backward-facing steps present in channels of the detonation chambers described herein, in accordance with various embodiments.

Figure 2:
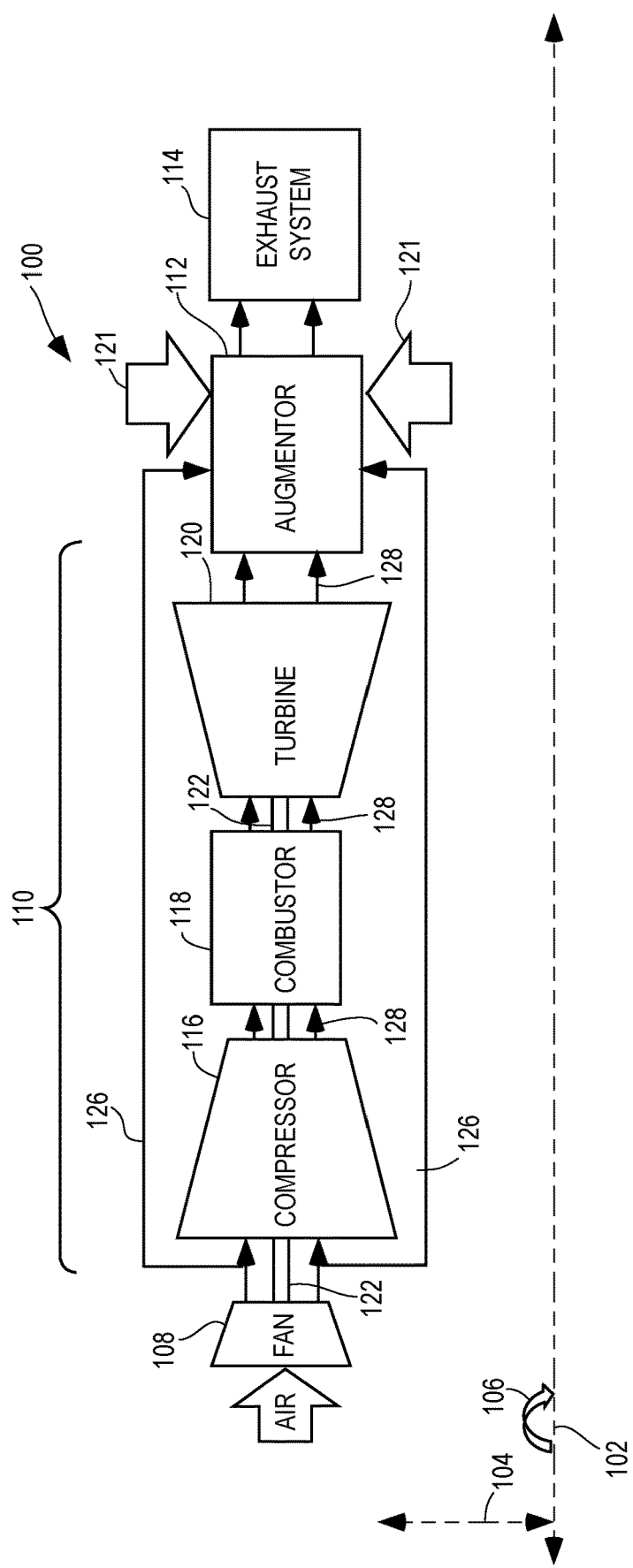
FIG. 2 comprises a schematic diagram of an engine as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Generally speaking, the various aspects of the present disclosure can be employed with augmentors for gas turbine engines to decrease the axial length and/or volume of the exhaust system. More specifically, the augmentors described herein incorporate a rotating detonation architecture, such as a rotating detonation architecture 1b as shown in FIGS. 1B and 1C. Such rotating detonation architectures may reduce the axial length and/or volume of the exhaust system while also adding performance benefits in the form of increased thrust. The rotating detonation architecture 1b, when incorporated into the exhaust system of a gas turbine engine, detonates an air-fuel mixture and generates one or more rotating detonation waves. The rotating detonation waves support combustion reactions in exhaust airflow exiting the core engine system to increase thrust for the gas turbine engine.

In a typical rotating detonation architecture of the prior art, such as a rotating detonation architecture 1a depicted in FIG. 1A, fuel is injected into an annular detonation chamber 2a. The annular detonation chamber 2a is defined, in part, by a centerbody 3a that extends axially along a midline X of the annular detonation chamber 2a. The centerbody 3a and a peripheral wall 6a define the annular detonation chamber 2a. The centerbody 3a forms an inner wall 4a of the annular detonation chamber 2a. Igniting the air-fuel mixture in the annular detonation chamber 2a initiates the rotating detonation reaction. The rotating detonation reaction is confined to an annulus. Thus, the rotating detonation wave from the rotating detonation reaction typically propagates circumferentially around the annulus and travels axially through the annular detonation chamber 2a. However, in the rotating detonation architecture 1a, the rotating detonation wave is generally unable to travel radially through the annular detonation chamber 2a. Further, the centerbody 4a generally prevents the rotating detonation wave from propagating towards the midline X. Incorporating the rotating detonation architecture 1a into an augmentor for a gas turbine engine may result in a high-loss system. Such a high-loss system may create high pressure losses that may not be amenable for use in a gas turbine engine for an aircraft and may not result in a flight-worthy system.

Figure 5A:
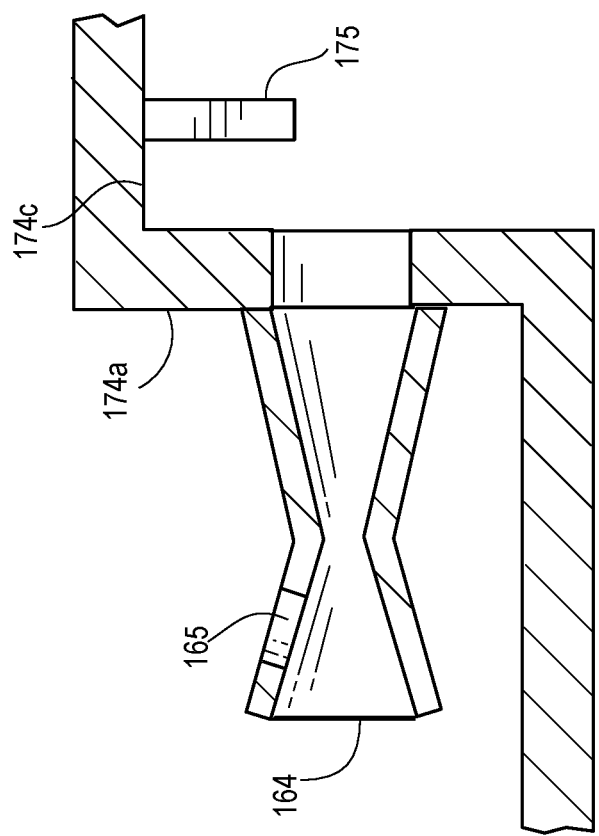
FIG. 5A comprises an enlarged view of the encircled portion of FIG. 5.

The rotating detonation architecture 1b depicted in FIGS. 1B and 1C, however, encourages a rotating detonation wave initiated by a rotating detonation reaction to propagate radially towards the midline X. Thus, when the rotating detonation architecture 1b is incorporated into a gas turbine engine exhaust system as an augmentor, for example as shown in FIGS. 3-5, the rotating detonation wave generated by a rotating detonation reaction is guided by a channel and propagates towards the exhaust system core to support combustion reactions occurring therein to provide increased thrust for the engine. Because rotating detonation is a form of pressure gain combustion, the rotating detonation wave affects a pressure increase across the gas turbine engine. Such a pressure gain may provide performance advantages to the engine. As such, the rotating detonation architecture 1b when employed as augmentors for a gas turbine engine may provide performance advantages, for example, in the form of increased thrust.

The rotating detonation architecture 1b includes a detonation chamber 2b. The detonation chamber 2b is defined by a peripheral wall 6b. The detonation chamber 2b incorporates a stabilization geometry 4b in the peripheral wall 6b. The stabilization geometry 4b, in the embodiment shown in FIGS. 1A and 1, is a channel. The stabilization geometry 4b includes a backward-facing step 8b and a forward-facing step 10b that are recessed in the peripheral wall 6b and joined by a recessed surface 9b. The backward-facing step 8b faces opposite the flow direction in the detonation chamber 2b (e.g., flow through the detonation chamber 2b would flow over the step). By contrast, the forward-facing 10b step faces the flow direction (e.g., flow through the detonation chamber 2b would hit the step). The recessed surface 9b is recessed, for example, relative to adjacent portions of the peripheral wall 6b. In some aspects, the stabilization geometry 4b may be a portion of the peripheral wall 6b. In other aspects, the stabilization geometry 4b may be a structure distinct from the peripheral wall 6b. The stabilization geometry 4b anchors a rotating detonation wave created by a rotating detonation reaction to the peripheral wall 6b and may also help to direct axially the rotating detonation wave towards the midline X. A rotating detonation wave may include both a combustion front (i.e., a chemical reaction happening as a fuel-air mixture is burned) and a shockwave. A detonation reaction results in a combustion front that is coupled to a shockwave whereas a combustion reaction includes a combustion front.

The detonation chamber 2b also lacks a centerbody so the detonation chamber 2b does not include an inner wall. Accordingly, the detonation chamber 2b is generally unobstructed from the midline X to the peripheral wall 6b. Thus, a rotating detonation wave generated by a rotating detonation reaction is not confined to an annulus and free to travel radially through the detonation chamber 2b. Because the detonation chamber 2b lacks a centerbody it also does not result in high pressure losses and is amenable for use in a gas turbine engine for an aircraft and results in a flight-worthy system.

Further, the rotating detonation architecture 1b may facilitate a more efficient and compact combustion reaction. The compact nature of the combustion reaction confines the reaction to a smaller volume, allowing for a reduction in the size of the augmentor and/or the exhaust system. This reduction in axial length and/or volume may also translate into a reduced weight of the gas turbine engine and improved range at a vehicle level and, in some aspects, may enable a more compact airframe. A smaller gas turbine engine may also provide strategic advantages in military applications, for example, by resulting in a smaller infrared signature. It is also contemplated that the rotating detonation architectures described herein may be used in other exhaust system architectures where deflagration is the primary mode of combustion.

The rotating detonation architecture 1b, which incorporates the stabilization geometry 4b and/or eliminates the centerbody 3a (FIG. 1A), may enhance turbulent mixing axially through the detonation chamber 2b. In this manner, the rotating detonation architecture 1b provides more efficient and compact combustion, resulting in a reduced axial length for engine core flow combustion. For instance, the designs of FIGS. 3-5 are illustrative examples of embodiments of rotating detonation-enabled augmentor systems that incorporate the rotating detonation architecture 1b into a gas turbine engine. These embodiments may shorten the length and/or reduce the volume of the exhaust system of the gas turbine engine, reducing the mass thereof.

Incorporating the rotating detonation architecture 1b into the augmentor of a gas turbine engine results in a more compact, efficient combustion reaction. The compact, efficient nature of the combustion reaction translates into a reduction in the axial length and/or a reduction in the volume of the exhaust system. A reduction the size of the exhaust system may also reduce the weight of the exhaust system, resulting in reduced material costs as well as reduced fuel consumption. Such a reduction in fuel consumption may further improve range at the vehicle or aircraft level. It is contemplated that the rotating detonation architecture described herein may reduce the exhaust system length by up to about 75 percent and may reduce the exhaust system weight by up to about 25 percent.

Further, the augmentor systems described herein are piloted by a rotating detonation reaction. A rotating detonation reaction is initiated by igniting a first fuel-air mixture (e.g., a fan air-fuel mixture or pilot air-fuel mixture) in the detonation chamber 1b. The rotating detonation reaction acts as a pilot for a combustion reaction occurring within the detonation chamber 1b. The rotating detonation reaction is initiated in the stabilization geometry 4b (i.e., channel) of the detonation chamber 1b. A rotating detonation wave generated by the rotating detonation reaction propagates toward the midline X of the detonation chamber. In this manner, the rotating detonation reaction is able to consume a second air-fuel mixture (e.g., a core air-fuel mixture) present at or adjacent the midline X of the detonation chamber 1b. Detonation is a supersonic combustion phenomenon that transpires over a constant volume and is advantageous to traditional subsonic deflagration combustion processes that take place at constant pressure. When compared to traditional augmentor systems, a rotating detonation combustor piloted system as described herein may have a faster heat release rate and result in a smaller combustion front for improved fuel consumption. Combustion via detonation may also result in an increase of the localized pressure. The foregoing and other benefits may become clearer upon making a thorough review and study of the following detailed description.

While the rotating detonation architecture 1b is described in with reference to a gas turbine engine embodiment, it is contemplated that the rotating detonation architecture 1b or other systems and methods described herein that incorporate such an architecture may also be employed in a missile system or in a hypersonic system such as, for example, a hypersonic aircraft or hypersonic missile.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, and in particular to FIG. 2, a gas turbine engine 100 that is compatible with many of these teachings will now be presented. It should be appreciated that the gas turbine engine 100 depicted in FIG. 2 and described below is by way of example only. In other embodiments, the gas turbine engine 100 may have any other suitable configuration. For example, in other exemplary embodiments, the gas turbine engine 100 may include any suitable number of compressors, turbines, and/or shafts. Additionally, the gas turbine engine 100 may not include each of the features described herein, or alternatively, may include one or more features not described herein. Additionally, the gas turbine engine 100 may be configured as any other suitable ducted gas turbine engine such as, for example, a turbofan engine, or used in conjunction with a ramjet engine or a scramjet engine. In a ramjet or scramjet configuration, the turbomachinery will be bypassed as the temperatures are too extreme.

As a frame of reference, the gas turbine engine 100 defines an axial direction 102, a radial direction 104, and a circumferential direction 106 (i.e., a direction extending about the axial direction 102).

The gas turbine engine 100 includes a fan 108 followed by a core section 110, an augmentor 112, and an exhaust system 114. The core section 110 includes a compressor 116 followed by a combustor 118 and a turbine 120. The augmentor 112 is positioned downstream of the core section 110 and upstream of the exhaust system 114. A shaft 122 is coupled to several components throughout the gas turbine engine 100, including the compressor 116 and the turbine 120. Further, the shaft 122 is coupled to a load (not shown).

The fan 108 draws air into the gas turbine engine 100. It is contemplated that the fan 108 may be any suitable type of air intake device, such as a cold air intake. The fan 108 draws air into the gas turbine engine 100. The turbine 120 may drive rotation of blades of the fan. The fan 108 is in fluid communication with a bypass airflow passage 126 and a core air path 128.

The compressor 116 is positioned downstream of the fan 108 and upstream of the turbine 120. The compressor 116 includes blades rigidly mounted to a rotor which is coupled to the shaft 122. The combustor 118 is positioned downstream of the compressor 116. The combustor 118 is configured to combust an air-fuel mixture and includes a passage to route combustion gases into the turbine 120.

The turbine 120 includes one or more stators having fixed vanes or blades, and one or more rotors having blades which rotate relative to the stators. The turbine 120 includes a turbine rotor that is coupled to the shaft 122.

The augmentor 112 is configured to combust mixtures of fuel and air in a volume thereof and incorporates a rotating detonation architecture to generate a rotating detonation wave. The rotating detonation architecture of the augmentor 112 is illustrated and described in detail with reference to FIGS. 3 and 4. The augmentor 112 incorporates one or more fuel supply systems 121. The one or more fuel supply systems 121 may supply a liquid fuel or a gaseous fuel, such as jet fuel, methane, ethylene, or H2. The fuel type may depend on the engine architecture, engine size, and/or thrust class. It is contemplated that fuel may be delivered to the augmentor 112 using one or more separate fuel delivery systems. The augmentor 112 is positioned downstream of the turbine 120 of the gas turbine engine 100 and is positioned upstream of the exhaust system 114.

As will be appreciated, the shaft 122 may be coupled to a load. The load may be any suitable device that may use the power of the rotational output of the gas turbine engine 100, such as an external mechanical load or an electrical generator. For example, the load may include a propeller of an airplane or an electrical generator.

In operation, air enters the gas turbine engine 100 through the fan 108. A portion of the air passes into the bypass airflow passage 126 to provide bypass air flow to the augmentor 112. Another portion of the air passes into the core section 110 and flows through the core air path 128 as core air. The core air enters the compressor 116. As the core air passes through the rotating blades of the compressor 116 the pressure increases, thereby providing the combustor 118 with sufficient air for combustion. The combustor 118 receives core air from the compressor 116 and fuel from a fuel supply (not shown in FIG. 2) forming an air-fuel mixture. The combustor 118 ignites and combusts the air-fuel mixture and passes hot pressurized gases into the turbine 120. The hot pressurized gases pass through rotor blades of the turbine 120, thereby driving the turbine rotor to rotate. Coupling between the turbine rotor and the shaft 122 causes the shaft 122 to rotate. The rotor of the compressor 116 is driven to rotate by the shaft 122.

The augmentor 112 receives core air from the turbine 120 via the core air path 128. The augmentor 112 also receives bypass air from the fan 108 via the bypass airflow passage 126. Fuel is provided to the augmentor 112 via the one or more fuel supply systems 121 (see detail in FIG. 3). The augmentor 112 ignites a mixture of bypass air and fuel in a rotating detonation reaction. The rotating detonation reaction supports combustion reaction that consumes of a mixture of core air and fuel in the augmentor 112. Products from the reactions occurring within the augmentor 112, which include hot pressurized gases, pass into the exhaust system 114, enhancing thrust. The products exit the gas turbine engine 100 through an outlet of the exhaust system 114 to generate thrust for the gas turbine engine 100.

Referring now to FIG. 3, the augmentor 112 of the gas turbine engine 100 of FIG. 2 is illustrated. The augmentor 112 is configured as a rotating detonation system. That is, a detonation chamber 152 occupying at least a portion the volume of the augmentor 112 is employed to generate and/or stabilize a rotating detonation wave generated by reactions occurring therein. Though the augmentor 112 and exhaust system 114 are shown as separate components in FIG. 2, it is contemplated that the augmentor 112 may be integrated into the exhaust system 114 of the gas turbine engine 100. That said, discrete boundaries between the augmentor 112 and the exhaust system 114 may not be present.

As depicted, the augmentor 112 includes a volume defined by a peripheral wall 140 of the exhaust system 114. The augmentor 112 incorporates a rotating detonation architecture, such as the rotating detonation architecture 1b of FIGS. 1B and 1C, to generate and stabilize a rotating detonation wave. While the augmentor 112 is one example of a system that may employ the rotating detonation architectures described herein, it is contemplated that other rotating detonation systems may incorporate the rotating detonation architectures illustrated in FIG. 3 or similar architectures. The rotating detonation wave supports combustion reactions occurring in the augmentor 112 and, in this manner, helps to reduce the axial length required for combustion in the augmentor 112 and/or the exhaust system 114.

The augmentor 112 has a volume that generally includes an upstream portion 130 and a downstream portion 132. A midline 134 extends through the middle of the augmentor 112. The upstream portion 130 of the augmentor 112 provides upstream fueling for the detonation chamber 152, which is included in the downstream portion 132. The detonation chamber 152, which occupies at least a portion of the volume of the augmentor 112, incorporates a rotating detonation architecture similar to the rotating detonation architecture 1b that is described with reference to FIG. 1B. In particular, the detonation chamber 152 includes a channel 150 for stabilizing and/or guiding a rotating detonation wave. The upstream fueling is accomplished via a core fuel delivery system 146 and a pilot fuel delivery system 142. The core fuel delivery system 146 and the pilot fuel delivery system 142 deliver fuel-air mixtures to the detonation chamber 152 to support combustion and detonation reactions occurring therein.

The upstream portion 130 of the augmentor 112 receives combustion reactants (e.g., a mixture of core air and fuel) and detonation reactants (e.g., a mixture of fan air or other sources of pilot air and fuel). The upstream portion 130 of the augmentor 112 includes a pilot inlet path 136 that delivers the detonation reactants to the detonation chamber 152. The upstream portion 130 further includes a core inlet path 138 that delivers the combustion reactants to the detonation chamber 152. The peripheral wall 140 extends axially through the upstream portion 130 and the downstream portion 132 of the augmentor 112. In some aspects, the peripheral wall 140 is a liner of the exhaust system 114 (FIG. 2). The peripheral wall 140 defines at least a portion of the pilot inlet path 136 and the core inlet path 138.

The pilot inlet path 136 is in fluid communication with the fan 108 and the bypass airflow passage 126 (not shown in FIG. 3) of the gas turbine engine 100, as depicted in FIG. 2. The pilot inlet path 136 delivers a mixture of air from the fan 108 (not shown in FIG. 3) of the gas turbine engine 100 and fuel to the detonation chamber 152. Though fan air is the air source for the pilot inlet path 136 in the embodiment depicted in FIG. 3, it is contemplated that, in other embodiments, other air sources, air intake devices, or air supplies may be employed to provide pilot air to the detonation chamber 152. The pilot inlet path 136 is configured to deliver a pilot air-fuel mixture 144 to the channel 150 in the detonation chamber 152. For example, an outlet of the pilot inlet path 136 may be disposed in a wall of the channel 150 to deliver the pilot air-fuel mixture 144 to the channel 150. The pilot inlet path 136 may be any suitable configuration that functions to deliver the pilot air-fuel mixture 144 to the channel 150 of the detonation chamber 152. FIGS. 7A-7D illustrate various suitable configurations for the outlet of the pilot inlet path 136 in the channel 150.

The pilot fuel delivery system 142 is coupled to the pilot inlet path 136. The pilot fuel delivery system 142 may be any suitable fuel delivery system such as spray bars, fuel vanes, wall orifices (e.g., circular or shaped), or similar. The pilot fuel delivery system 142 conditions air and feeds fuel into the pilot inlet path 136 to create the pilot air-fuel mixture 144. It is also contemplated that the pilot fuel delivery system 142 may deliver other reactants for a rotating detonation reaction to the pilot inlet path 136. Other reactants may include, for example, oxidizers. The pilot fuel delivery system 142 has one or more outlet ports 142a disposed in the pilot inlet path 136. Any suitable type of fuel delivery systems such as, for example, an orifice or a converging/diverging geometry may be used to deliver fuel and other reactants to the pilot inlet path 136. In one embodiment, the pilot fuel delivery system 142 may be configured to pre-mix fuel and an air or other oxidizers. An igniter (not shown in FIG. 3) configured to ignite the pilot air-fuel mixture 144 may also be associated with the pilot fuel delivery system 142. Any suitable igniter may be used, such as a spark, kernel, pulse detonation wave, plasma field, or the like. In some embodiments, the igniter may be disposed in the channel 150 of the detonation chamber 152.

The core inlet path 138 is a passageway extending along the midline 134 of the upstream portion 130 of the augmentor 112. The core inlet path 138 is in fluid communication with the outlet of the turbine 120 (not shown in FIG. 3) of the gas turbine engine 100, as depicted in FIG. 2. The core inlet path 138 delivers a mixture of core air from the core section 110 (not shown in FIG. 3) of the gas turbine engine 100 and fuel to the detonation chamber 152.

The core fuel delivery system 146 is coupled to the core inlet path 138 and is configured to feed fuel into the core inlet path 138 to create a core air-fuel mixture 148. The core fuel delivery system 146 is positioned upstream of the detonation chamber 152. The core fuel delivery system 146 has one or more outlets 146a disposed in the core inlet path 138. Any suitable type of fuel delivery systems such as, for example, an orifice (e.g., shaped or circular wall orifice), a converging/diverging geometry, vanes, and/or spray bars may be used to deliver fuel and other reactants to the core inlet path 138. An igniter (not shown in FIG. 3) configured to ignite the core air-fuel mixture 148 may also be associated with the core fuel delivery system 146. Any suitable igniter may be used, such as a spark, kernel, pulse detonation wave, plasma field, or the like. The core fuel delivery system 146 is disposed upstream of the pilot fuel delivery system 142.

The downstream portion 132 of the augmentor 112 includes the detonation chamber 152. The pilot inlet path 136 and the core inlet path 138 are in fluid communication with the detonation chamber 152. Thus, the detonation chamber 152 receives the core air-fuel mixture 148 (i.e., the combustion reactants) and the pilot air-fuel mixture 144 (i.e., the detonation reactants) from the upstream portion 130 of the augmentor 112. Further, the downstream portion 132 releases detonation products. Detonation products and combustion products may be released, for example, into a nozzle of the exhaust system 114 (FIG. 2). Detonation products and combustion products may include, for example, carbon dioxide, water vapor, and any other products generated by a reaction of the pilot air-fuel mixture 144 and/or a reaction of the core air-fuel mixture 148.

The detonation chamber 152 may extend continuously in a radial direction from the midline 134 of the augmentor 112 to the peripheral wall 140, that is, the detonation chamber 152 is generally uninterrupted by walls in the radial direction. The detonation chamber 152 is hollow and is substantially unobstructed in the radial direction as it lacks a centerbody or other circumferential wall that is radially inward of the peripheral wall 140 and extends in an axial direction through a volume thereof to define an annulus. The detonation chamber 152 includes a pilot detonation zone 154 and a core reaction zone 156, which are illustrated and described in further detail with reference to FIG. 4.

The detonation chamber 152 includes the channel 150 formed in the peripheral wall 140 of the augmentor 112. The channel 150 is a stabilization geometry that acts to stabilize and/or guide a rotating detonation wave that is generated in the detonation chamber 152. The channel 150 includes a backward-facing step 151a and a forward-facing step 151b. The channel 150 further includes a recessed surface 151c that is recessed, for example, from adjacent portions of the peripheral wall 140 and extends between the backward-facing step 151a and the forward-facing step 151b. Though shown as a channel 150, it is contemplated that the channel 150 may take other shapes. The channel 150 may be any shaped-cavity that is recessed into the peripheral wall 140 of the augmentor by the backward-facing step 151a and/or the forward-facing step 151b. For example, the stabilization geometry may be another form of recessed cavity or passageway in the peripheral wall 140.

The pilot inlet path 136 is in fluid communication with the channel 150. The pilot inlet path 136 includes an outlet that passes through the backward-facing step 151a. It is contemplated that, in other embodiments, the pilot inlet path 136 may pass through other portions of the channel, such as the forward-facing step 151b.

In some embodiments, a centerbody may be present in the upstream portion 130 of the augmentor 112 and extend into at least a portion of the core inlet path 138 as shown, for example, in the embodiment depicted in FIG. 5. In some embodiments, the downstream portion 132 of the augmentor 112, however, lacks a centerbody. In other embodiments, both the upstream portion 130 and the downstream portion 132 of the augmentor 112 lack a centerbody. In other embodiments, a centerbody may extend into only a portion of the downstream portion 132 of the augmentor 112.

In operation, the augmentor 112 injects fuel into an exhaust flow of the gas turbine engine 100. With reference to FIG. 2, the exhaust flow includes core air flowing through the core air path 128 exiting the turbine 120 and bypass air flowing through the bypass airflow passage 126. The augmentor 112 burns the fuel in rotating detonation and combustion reactions to provide additional thrust for the gas turbine engine 100. Referring again to FIG. 3, fuel is injected into the exhaust flow in the upstream portion 130 of the augmentor 112. The fuel is consumed in rotating detonation and combustion reactions in the downstream portion 132.

The upstream portion 130 of the augmentor 112 receives air from the core section 110 and from the bypass airflow passage 126 of the gas turbine engine 100, as depicted in FIG. 2. Air from the fan 108 of the gas turbine engine 100 passes through the bypass airflow passage 126 and into the pilot inlet path 136 of the augmentor 112. Thus, the bypass airflow passage 126 (FIG. 2) supplies fan air to the pilot inlet path 136 of the augmentor 112. The pilot fuel delivery system 142 delivers fuel and, in some approaches, other reactants into the pilot inlet path 136 to create the pilot air-fuel mixture 144. The pilot inlet path 136 delivers the pilot air-fuel mixture 144 into the detonation chamber 152, in particular, into the channel 150.

Additionally, vitiated core air from the core section 110 of the gas turbine engine passes from the turbine 120 into the core inlet path 138 of the augmentor 112. The core fuel delivery system 146 delivers fuel and, in some approaches, other reactants into the core inlet path 138 to create the core air-fuel mixture 148. The core inlet path 138 delivers the core air-fuel mixture 148 into the detonation chamber 152.

In the detonation chamber 152, the pilot air-fuel mixture 144 reacts in the channel 150. In some embodiments, an igniter is included in the channel 150 to ignite the pilot air-fuel mixture and initiate the rotating detonation wave. In general, the pilot air-fuel mixture 144 detonates in the pilot detonation zone 154 in a rotating detonation reaction. As a result, a rotating detonation wave is generated in the augmentor 112. The core air-fuel mixture 148 reacts adjacent the midline 134 in the detonation chamber 152. In general, the core air-fuel mixture 148 combusts in the core reaction zone 156 in a combustion reaction. Vitiated core air flow exiting the turbine 120 of the gas turbine engine 100 is reheated via the reactions occurring within the detonation chamber 152, generating additional thrust.

The channel 150 helps to direct the rotating detonation wave generated by the rotating detonation reaction circumferentially along the peripheral wall 140. The backward-facing step 151a and the forward-facing step 151b direct energy from the rotating detonation wave radially through the detonation chamber 152 toward the midline 134. Because the detonation chamber 152 is unobstructed and generally lacks physical structures between the pilot detonation zone 154 and the core reaction zone 156, the rotating detonation wave is free to travel from the pilot detonation zone 154 into the core reaction zone 156. In this manner, the rotating detonation wave supports the combustion reaction occurring in the core reaction zone 156. Thus, the rotating detonation wave consumes a portion of the core air-fuel mixture 148 in the core reaction zone 156 to support the core combustion reaction. The rotating detonation wave may serve as pilot for the combustion reaction occurring in the core reaction zone 156, igniting the combustion of the core air-fuel mixture.

It is contemplated that the curvature of the channel 150 circumferentially along the peripheral wall 140 focuses the rotating detonation wave so that the rotating detonation wave propagates around the circumference of the detonation chamber 152 and travels through the pilot detonation zone 154. In this manner, the channel 150 provides a stable spot for the rotating detonation wave to travel circumferentially in the detonation chamber 152. By directing the rotating detonation wave circumferentially, the channel 150 may limit the travel of the wave in the upstream or downstream directions. The backward-facing step 151a and forward-facing step 151b create a pocket to stabilize and/or guide the rotating detonation wave. Such stabilization and/or guidance may limit or prevent the rotating detonation wave from travelling in the axial direction. Further, by limiting axial propagation of the rotating detonation wave, the backward-facing step 151a and the forward-facing step 151b may also help to focus energy of the rotating detonation wave radially through the detonation chamber 152 and towards the midline 134 of the detonation chamber 152. In this manner, the channel 150 provides enhanced turbulent mixing radially throughout the detonation chamber (e.g., between the pilot detonation zone 154 and the core reaction zone 156). The unobstructed structure of the detonation chamber 152 also permits the rotating detonation wave to propagate towards the midline 134 of the detonation chamber 152 to further enhance combustion reactions occurring in the core reaction zone 156.

The rotating detonation-supported combustion reaction in the augmentor 112 may be more compact than a combustion reaction that is unsupported by a rotating detonation wave. The compact nature of the rotating detonation-supported combustion reaction may translate to a reduction in an axial length and/or a volume of the augmentor 112 and/or the exhaust system 114 (FIG. 2). Such a reduction in the axial length and/or the volume may also directly translate to a reduction in the weight of the gas turbine engine 100 (FIG. 2). The reduction in weight reduces fuel consumption and increases the range of a vehicle powered by the gas turbine engine 100. In addition, the rotating detonation-supported combustion reaction may provide increased thrust for a vehicle powered by the gas turbine engine 100.

Turning to FIG. 4, the detonation chamber 152 of the augmentor 112 is further illustrated in a cross-sectional view taken along line 4-4 of FIG. 3. In particular, FIG. 4 illustrates relative positions of the pilot detonation zone 154 and the core reaction zone 156 in the detonation chamber 152.

The detonation chamber 152 includes an open volume that extends from the midline 134 of the exhaust system 114 (FIG. 2) to the peripheral wall 140. The detonation chamber 152 is generally cylindrical in shape, though, it is to be noted that the shape of the detonation chamber 152 is defined by the peripheral wall 140 and may take other non-circular shapes (e.g., shapes having non-circular cross-sectional areas from an aft-end view) such as oblong or elliptical shapes. As described above, the detonation chamber 152 lacks a centerbody and, accordingly, lacks walls or other structures that confine reactions occurring within the detonation chamber 152 to an annulus within the detonation chamber 152.

The core reaction zone 156 extends axially along the midline 134. The pilot detonation zone 154 extends circumferentially around the core reaction zone 156 adjacent to the peripheral wall 140. The pilot detonation zone 154 is generally defined by the channel 150 that is formed in the peripheral wall 140. It is to be understood that there may not be discrete boundaries or delineation between the pilot detonation zone 154 and the core reaction zone 156. Rather, the pilot detonation zone 154 and the core reaction zone 156 may designate the approximate regions within the detonation chamber 152 in which various reactions occur. For example, the core reaction zone 156 may designate the approximate region in which the core air-fuel mixture 148 (FIG. 3) reacts or is otherwise consumed, for example, in a combustion reaction. The pilot detonation zone 154 may designate the approximate region in which the pilot air-fuel mixture 144 (FIG. 3) reacts or is otherwise consumed, for example, in a combustion and/or detonation reaction.

In operation, the pilot air-fuel mixture 144 (FIG. 3) reacts in the pilot detonation zone 154, initiating a rotating detonation wave. The rotating detonation wave may travel axially through the pilot detonation zone 154. The rotating detonation wave also travels radially into at least a portion of the core reaction zone 156 and propagates towards the midline 134 of the augmentor 112. In this manner, the rotating detonation reaction also consumes the core air-fuel mixture 148 in the core reaction zone 156 and supports a combustion reaction occurring therein. The reactions occurring within the pilot detonation zone 154 and the core reaction zone 156.

Reactions that occur in the pilot detonation zone 154 serve as a ignition sources (or "pilot") for core flow present in the core reaction zone 156. The core flow includes the core air-fuel mixture 148 (FIG. 3) and, thus, the reactions in the pilot detonation zone 154 act as a pilot for fuel present in the core reaction zone 156. The core flow will have deflagration combustion but is encouraged or excited by enhanced turbulence.

FIG. 5 illustrates an exemplary structure of an augmentor 160 that includes a rotating detonation architecture as described herein. The augmentor 160 is incorporated into an exhaust system 161 of a gas turbine engine. The augmentor 160 includes a detonation chamber 178 in which reactions, including detonation reactions and combustion reactions occur. The detonation chamber 178 is positioned downstream of the gas turbine engine core section (not shown in FIG. 6) and upstream of an exhaust nozzle 184. The augmentor 160 also includes a core inlet path 162 and a pilot inlet path 164 for delivering air-fuel mixtures to the detonation chamber 178 to support reactions that occur therein.

The core inlet path 162 delivers a mixture of core air and fuel (e.g., a first air-fuel mixture or a core air-fuel mixture) to the detonation chamber 178. The core inlet path 162 is in fluid communication with a core air path of the gas turbine engine (not shown in FIG. 6). The core inlet path 162 of the augmentor 160 is bounded by a centerbody 168 and a peripheral wall 170 of exhaust system 161. In the embodiment depicted in FIG. 5, the centerbody 168 may be a tail cone of the gas turbine engine. The centerbody 168 extends from a core section (not shown in FIG. 6) of the gas turbine engine into a portion of the augmentor 160. The centerbody 168 ends before the detonation chamber 178. The peripheral wall 170 surrounds an exhaust system core 171. In some embodiments, the peripheral wall 170 of the gas turbine engine is an exhaust liner. The peripheral wall 170 may be shaped to help direct, guide, or setup the rotating detonation wave for enhanced mixing. One or more struts 166 extend radially into the core inlet path 162 to support the centerbody 168. In order to provide fuel to the core inlet path 162, one or more vanes 172 extend radially into the core inlet path 162. For example, the vanes 172 may include slots or other openings such that fuel may be injected into the vanes 172 and pass from the vanes 172 and through such slots or openings into the core inlet path 162.

The pilot inlet path 164 delivers a mixture of fuel and fan air from the gas turbine engine air intake (e.g., a second fuel-air mixture or a pilot air-fuel mixture) to the detonation chamber 178, The pilot inlet path 164 is in fluid communication with a bypass airflow passage 169 of the gas turbine engine. The pilot inlet path 164 may be formed, at least in part, by a case or outer duct of the gas turbine engine. The pilot inlet path 164 is in fluid communication with a channel 176 formed in the peripheral wall 170 of the detonation chamber 178. The pilot inlet path 164 may receive air from any air intake, such as a fan (not shown in FIG. 6) of the gas turbine engine via the bypass airflow passage 169. One or more orifices 165 may deliver fuel to the pilot inlet path 164. The one or more orifices 165 in the pilot inlet path 164 are depicted in further detail in FIG. 5A.

In some embodiments, the pilot inlet path 164 has a converging/diverging geometry. It is contemplated that a converging/diverging geometry may help to limit or prevent reactions occurring within the detonation chamber 178 from traveling upstream back into the bypass airflow passage 169.

An igniter 175 is disposed, at least partially, within the channel 176. The igniter 175 is configured to ignite the pilot air-fuel mixture that is delivered to the channel 176 by the pilot inlet path 164. It is contemplated that any suitable type of ignition system may be employed in the igniter 175. The igniter 175 extends from a recessed surface 174c into the channel 176. It is contemplated, however, that the igniter 175 may be coupled to any one of a backward-facing step 174a, a forward-facing step 174b, or a recessed surface 174c.

The core inlet path 162 and the pilot inlet path 164 are in fluid communication with the detonation chamber 178. The detonation chamber 178 is bounded by the peripheral wall 170 of the augmentor 160. The peripheral wall 170 may be an exhaust liner of the gas turbine engine.

In some embodiments, the centerbody 168 does not extend into the detonation chamber 178. Thus, the detonation chamber 178 has a centerbody-less construction and is generally unobstructed from a midline of the detonation chamber 178 to the peripheral wall 170. The detonation chamber 178 lacks any axially extending walls that interrupt the volume of the detonation chamber 178 or that define an annulus therein.

The detonation chamber 178 includes the channel 176, which serves as a stabilization geometry for a rotating detonation wave generated in the detonation chamber 178. The channel 176 is a circumferentially-extending recess or groove in the peripheral wall 170 that extends around the augmentor 160. The channel 176 includes a backward-facing step 174a and a forward-facing step 174b. A recessed surface 174c extends between the backward-facing step 174a and the forward-facing step 174b. One or more of the backward-facing step 174a and the forward-facing step 174b may be sloped or disposed at an angle relative to a radial direction. For example, the backward-facing step 174a and/or the forward-facing step 174b may not be perpendicular to the peripheral wall 170 and, instead, may be at an incline from the peripheral wall 170 to the recessed surface 174c. It is also contemplated that the backward-facing step 174a and/or the forward-facing step 174b may not be straight and, for example, may be curved or rounded. It is contemplated that sloping the backward-facing step 174a and/or the forward-facing step 174b may help to focus energy from a rotating detonation wave radially through the detonation chamber 178 and to anchor the rotating detonation wave circumferentially to limit axial travel. The channel 176 is formed downstream of the core inlet path 162. It is to be noted that while FIG. 5 employs a channel 176, other suitable stabilization geometries incorporating a backward-facing step 174a and/or a forward-facing step 174b that extend about the circumference of the detonation chamber 178 may be used.

In some embodiments, the backward-facing step 174a and the forward-facing step 174b are about the same height. In other embodiments, the backward-facing step 174a and the forward-facing step 174b are different heights. In some embodiments, the backward-facing step 174a and/or the forward-facing step 174b have a height in the range of about 0.25 inches to about 6 inches, and in some aspects, in the range of about 0.5 inches to about 2 inches. In some embodiments, the length of the channel 176 (i.e., the axially extending distance of the channel 176) may be in the range of about 1 inch to about 12 inches, in some aspects, about 1 to about 8 inches, and, in some aspects, may be in the range of about 2 inches to about 6 inches. In some embodiments, the length of the channel 150 does not extend along the entire axial length of the detonation chamber 178 or the entire axial length of the augmentor 160. In some embodiments, the backward-facing step 174a and the forward-facing step 174b are about the same height. In other embodiments, the backward-facing step 174a and the forward-facing step 174b are different heights.

The detonation chamber 178 also includes a core reaction zone 180 and a pilot detonation zone 182. The core reaction zone 180 is disposed downstream of the core inlet path 162 and extends a long a midline of the augmentor 160. The pilot detonation zone 182 is adjacent to the peripheral wall 170 and extends into the channel 176. The pilot detonation zone 182 extends along a circumference of the augmentor 160 around the core reaction zone 180.

In the embodiment shown in FIG. 5, the centerbody 168 is shown terminating upstream of the detonation chamber 178. However, the centerbody 168 may also terminate or close-out in an upstream portion of the detonation chamber 178. In some embodiments, the centerbody 168 may terminate somewhere between the backward-facing step 174a and the forward-facing step 174b of the channel 176. In other embodiments, the centerbody 168 may terminate downstream of the forward-facing step 174b of the channel 176. For example, the centerbody 168 may extend approximately one channel-length (i.e., a length of the channel 176 as measured as a distance between the backward-facing step 174a and the forward-facing step 174b) beyond the channel 176.

The exhaust nozzle 184 is in fluid communication with the detonation chamber 178 and receives exhaust flow from the detonation chamber 178. In some embodiments, the exhaust nozzle 184 may be a converging nozzle. In other embodiments, the exhaust nozzle may be a converging/diverging nozzle and/or a variable area nozzle.

In operation, the core inlet path 162 delivers a core air-fuel mixture (e.g., a first air-fuel mixture) into the core reaction zone 180 to support a combustion reaction therein. The pilot inlet path 164 delivers a pilot air-fuel mixture into the channel 176 (e.g., the pilot detonation zone 182) to support a rotating detonation reaction therein. The igniter 175 ignites the pilot air-fuel mixture to initiate the rotating detonation reaction, which generates a rotating detonation wave. The rotating detonation wave originates in the channel 176 (e.g., the pilot detonation zone 182). At least a portion of the rotating detonation wave travels radially through the detonation chamber 178 to ignite the core air-fuel mixture. In this manner, the rotating detonation wave acts as a pilot for the combustion reaction occurring along a midline of the detonation chamber 178 (e.g., in the core reaction zone 180).

It is contemplated that the channel 176 may help to anchor the rotating detonation reaction and focus the rotating detonation wave caused by the rotating detonation reaction along the peripheral wall 170. The rotating detonation wave also travels into the core reaction zone 180 to initiate and/or enhance the combustion reaction therein. In this manner, the rotating detonation wave may serve to ignite the combustion of the core air-fuel mixture present along the midline of the detonation chamber 178.

FIG. 6 provides an overview of a method for thrust augmentation in a gas turbine engine. In some approaches, the method may be implemented using the augmentor 112 described with reference to FIGS. 3-4 or using the augmentor 160 described with reference to FIG. 5. It is also contemplated that the method of FIG. 6 may be used to augment other exhaust system architectures where deflagration is the primary mode of combustion.

The method includes supplying 190 a core air-fuel mixture (e.g., a first air-fuel mixture) to a detonation chamber bounded by a peripheral wall of an exhaust system, for example a gas turbine engine exhaust system. Fuel may be supplied to a core inlet path of the exhaust system, for example, via a core fuel delivery system to create the core air-fuel mixture. The detonation chamber is bounded by a peripheral wall of the gas turbine engine exhaust system. In some embodiments, the peripheral wall is an exhaust liner. The detonation chamber includes a channel formed in the peripheral wall. The channel is formed via a backward-facing step and a forward-facing step in the peripheral wall. Further, the detonation chamber may lack a centerbody and, accordingly, extend from a midline of the exhaust system to the peripheral wall of the gas turbine engine exhaust system and include a generally uninterrupted volume.

The method also includes supplying 192 a fan air-fuel mixture (e.g., a second air-fuel mixture) to the detonation chamber. In some embodiments, another air supply, other than gas turbine engine fan air) may be used to provide the second air-fuel mixture to the detonation chamber. Fuel may be supplied to the channel of the detonation chamber, for example, via a pilot fuel delivery system to create a fan air-fuel mixture.

The method may also includes combusting the core air-fuel mixture the detonation chamber. The core air-fuel mixture may combust in a zone that extends along a midline of the exhaust system. In addition, the method includes reacting 196 the fan air-fuel mixture in the detonation chamber. The reaction of the fan air-fuel mixture generates a rotating detonation wave that consumes the core-air fuel mixture to support a combustion reaction within the detonation chamber. The fan air-fuel mixture may react or detonate in an area that extends circumferentially along the peripheral wall and around a midline of the detonation chamber. The core-air fuel mixture may react or combust adjacent to the midline of the detonation chamber.

In some embodiments, the method includes stabilizing 198 a rotating detonation wave that is created by the detonation reaction. Such stabilization may be accomplished via a stabilization geometry, such as a channel formed in the peripheral wall of the gas turbine engine exhaust system. Stabilization may involve directing the rotating detonating wave along the peripheral wall. Further, stabilization may also involve focusing the rotating detonation wave axially through the detonation chamber toward the midline. The unobstructed nature of the detonation chamber may also help the rotating detonation wave to travel towards the midline of the exhaust system to support the combustion reaction occurring in the core reaction zone.

FIGS. 7A, 7B, 7C, and 7D illustrate various configurations for the backward-facing steps in the channels of the detonation chambers described herein. These backward-facing steps include exemplary configurations for the outlet of the pilot inlet path. FIGS. 7A, 7B, 7C, and 7D provide forward-looking aft-end views of the backward-facing steps. While these figures illustrate the outlet of the pilot inlet path in the backward-facing step, it is also contemplated that, in some embodiments, the outlet may be present in another wall of the channel, such as the recessed surface or forward-facing step of the channel.

In FIG. 7A, the outlet of the pilot inlet path is an annular slot 204 in a backward-facing step 202A of the channel. While a portion of the annular slot 204 is depicted in FIG. 7A, it is to be understood that this annular slot 204 would extend circumferentially about the detonation chamber of the augmentor.

In FIG. 7B, the outlet of the pilot inlet path is an annular slot 206 in the backward-facing step 202B of the channel. The annular slot 206 includes a plurality of struts 208 for support. The struts 208 may be, for example, columns that extend across annular slot 206. It is contemplated that increasing the number of struts may increase the solidity of the backward-facing step 202B.

In FIG. 7C, the outlet of the pilot inlet path includes a plurality of circular holes 210 in a backward-facing step 202C. It is also contemplated that other non-circular holes or orifice shapes may be employed. The plurality of circular holes 210 are spaced from each other and are disposed centrally along the backward-facing step 202C. In some embodiments, the plurality of circular holes 210 may be staggered or offset from one another.

In FIG. 7D, the outlet of the pilot inlet path includes a plurality of non-circular holes 212 in a backward-facing step 202D. The non-circular holes 212 are elliptical in shape, however, it is to be understood that other non-circular geometries may be employed.

Further aspects of the disclosure are provided by the subject matter of the following clauses:

A gas turbine engine comprising: a core section; an exhaust system positioned downstream of the core section, the exhaust system having an exhaust system core, a peripheral wall surrounding the exhaust system core and an augmentor, the augmentor comprising: a detonation chamber disposed within at least a portion of the exhaust system core and defined by a portion of the peripheral wall of the exhaust system; a channel formed in the portion of the peripheral wall defining the detonation chamber; a core inlet path in fluid communication with the detonation chamber and a turbine of the gas turbine engine, wherein the core inlet path delivers a core air-fuel mixture to the detonation chamber; and a pilot inlet path in fluid communication with the detonation chamber and a fan of the gas turbine engine, wherein the pilot inlet path delivers a pilot air-fuel mixture to the detonation chamber; wherein the core air-fuel mixture reacts in the detonation chamber along a midline of the detonation chamber, and wherein a portion of the pilot air-fuel mixture reacts in the channel to create a rotating detonation wave.

The gas turbine engine of any preceding clause, wherein the rotating detonation wave propagates from the peripheral wall to consume at least a portion of the core air-fuel mixture.

The gas turbine engine of any preceding clause, wherein the detonation chamber is unobstructed from a midline of the detonation chamber to the peripheral wall.

The gas turbine engine of any preceding clause, wherein the channel includes a backward-facing step and a forward-facing step.

The gas turbine engine of any preceding clause, wherein the channel further includes a recessed surface extending between the backward-facing step and the forward-facing step.

The gas turbine engine of any preceding clause, wherein one or more of the backward-facing step and the forward-facing step is sloped.

The gas turbine engine of any preceding clause, wherein the detonation chamber includes a pilot detonation zone adjacent the peripheral wall and a core reaction zone that extends along the midline of the augmentor, and wherein the pilot air-fuel mixture reacts in the pilot detonation zone and the core air-fuel mixture reacts in the core reaction zone.

The gas turbine engine of any preceding clause, further comprising: an exhaust nozzle positioned downstream of the detonation chamber, wherein the exhaust nozzle is at least one of a converging/diverging nozzle or a variable area nozzle.

The gas turbine engine of any preceding clause, further comprising: a core fuel delivery system in fluid communication with the core inlet path, wherein the core fuel delivery system delivers a first fuel to the core inlet path to create the core air-fuel mixture; and a pilot fuel delivery system in fluid communication with the pilot inlet path, wherein the pilot fuel delivery system delivers a second fuel to the pilot inlet path to create the pilot air-fuel mixture.

The gas turbine engine of any preceding clause, wherein the core fuel delivery system is upstream of the detonation chamber.

The gas turbine engine of any preceding clause, wherein the detonation chamber lacks a centerbody.

The gas turbine engine of any preceding clause, wherein the detonation chamber has a non-circular cross-sectional area.

The gas turbine engine of any preceding clause, wherein the channel includes a backward-facing step, and wherein the pilot inlet path includes an outlet opening disposed in the backward-facing step.

The gas turbine engine of any preceding clause, wherein the outlet opening is an annular slot.

The gas turbine engine of any preceding clause, wherein a plurality of struts extend across the annular slot.

The gas turbine engine of any preceding clause, wherein the channel includes a backward-facing step, and wherein the pilot inlet path includes a plurality of holes disposed in the backward-facing step.

The gas turbine engine of any preceding clause, wherein one or more of the plurality of holes are circular in shape.

The gas turbine engine of any preceding clause, wherein the core inlet path is upstream of the pilot inlet path.

The gas turbine engine of any preceding clause, wherein the core fuel delivery system is positioned upstream of the pilot fuel delivery system.

The gas turbine engine of any preceding clause, wherein the pilot inlet path has a converging/diverging geometry.

The gas turbine engine of any preceding clause, wherein the pilot inlet path and the core inlet path are formed by a portion of the peripheral wall.

The gas turbine engine of any preceding clause, wherein an outlet opening of the pilot inlet path is disposed in at least one of the backward-facing step, the forward-facing step, or the recessed surface of the channel.

The gas turbine engine of any preceding clause, further comprising an igniter disposed in the channel.

The gas turbine engine of any preceding clause, wherein the igniter is coupled to at least one of the backward-facing step, the forward-facing step, or the recessed surface.

A rotating detonation system comprising: a volume defined by a peripheral wall, the volume having an upstream portion that receives a first air-fuel mixture including detonation reactants and a downstream portion that releases detonation products; and a detonation chamber occupying part of the volume, wherein the detonation chamber includes a channel formed in the peripheral wall, the channel extending circumferentially about a midline of the volume extending through the volume; wherein the first air-fuel mixture reacts in the detonation chamber to generate a rotating detonation combustion wave that is guided by the channel to support a combustion reaction that consumes a second air-fuel mixture within the volume.

The rotating detonation system of any preceding clause, wherein the detonation chamber lacks a centerbody.

The rotating detonation system of any preceding clause, wherein the channel comprises a backward-facing step and a forward-facing step.

The rotating detonation system of any preceding clause, wherein the channel further comprises a recessed surface extending between the backward-facing stem and the forward-facing step.

The rotating detonation system of any preceding clause, further comprising a pilot inlet path and a core inlet path disposed in an upstream portion of the rotating detonation system, wherein the pilot inlet path is in fluid communication with the channel, and wherein the core inlet path is in fluid communication with the detonation chamber.

The rotating detonation system of any preceding clause, further comprising a pilot fuel delivery system in fluid communication with the pilot inlet path and a core fuel delivery system in fluid communication with the core inlet path.

The rotating detonation system of any preceding clause, wherein the second air-fuel mixture is supplied to the volume upstream of the detonation chamber, and wherein first air-fuel mixture is supplied to the channel.

The rotating detonation system of any preceding clause, further comprising an igniter disposed in the channel.

The rotating detonation system of any preceding clause, wherein the combustion reaction occurs in a portion of the volume extending along the midline, and wherein the first air-fuel mixture reacts in the channel.

A method comprising: supplying a core air-fuel mixture to a detonation chamber bounded by a peripheral wall of a gas turbine engine exhaust system; supplying a fan air-fuel mixture to the detonation chamber; igniting the fan air-fuel mixture in the detonation chamber to create a rotating detonation wave, wherein the rotating detonation wave consumes the core air-fuel mixture to support a combustion reaction within the detonation chamber; and stabilizing the rotating detonation wave via a channel formed in the peripheral wall.

The method of any preceding clause, wherein the channel includes a backward-facing step, a forward-facing step, and a recessed surface extending between the backward-facing step and the forward-facing step.

The method of any preceding clause, further comprising: supplying a first fuel to core air of a gas turbine engine to create the core air-fuel mixture; and supplying a second fuel to fan bypass air of the gas turbine engine to create the fan air-fuel mixture.

The method of any preceding clause, wherein the first fuel is supplied to the core air upstream of the channel.

The method of any preceding clause, wherein at least a portion of the fan-air fuel mixture is supplied to the channel.

The method of any preceding clause, wherein at least a portion of the core-air fuel mixture is supplied along midline of the detonation chamber.

What is claimed is:

1. An engine comprising:
   a core section; and
   an exhaust system positioned downstream of the core section, the exhaust system having an exhaust system core, a peripheral wall surrounding the exhaust system core and an augmentor, the augmentor comprising:
   a detonation chamber disposed within at least a portion of the exhaust system core and defined by a portion of the peripheral wall of the exhaust system;
   a channel formed in the portion of the peripheral wall defining the detonation chamber, the peripheral wall including a backward-facing step having an opening extending therethrough, a body coupled to the backward-facing step along a border of the opening and disposed upstream of the opening, the body defining a pilot inlet path that delivers a pilot air-fuel mixture through the opening to the detonation chamber, the pilot inlet path in fluid communication with the detonation chamber and a fan of the engine, the pilot inlet path including a fuel delivery orifice upstream of the opening;

a core inlet path in fluid communication with the detonation chamber and a turbine of the engine, wherein the core inlet path delivers a core air-fuel mixture to the detonation chamber; and wherein the core air-fuel mixture reacts in the detonation chamber along a midline of the detonation chamber, and wherein a portion of the pilot air-fuel mixture reacts in the channel to create a rotating detonation wave.

2. The engine of claim 1, wherein the rotating detonation wave propagates from the peripheral wall to consume at least a portion of the core air-fuel mixture.

3. The engine of claim 1, wherein the detonation chamber is unobstructed from the midline of the detonation chamber to the peripheral wall.

4. The engine of claim 1, wherein the channel includes a forward-facing step.

5. The engine of claim 4, wherein one or more of the backward-facing step and the forward-facing step is sloped.

6. The engine of claim 1, wherein the detonation chamber includes a pilot detonation zone adjacent the peripheral wall and a core reaction zone that extends along the midline of the detonation chamber, and wherein the pilot air-fuel mixture reacts in the pilot detonation zone and the core air-fuel mixture reacts in the core reaction zone.

7. The engine of claim 1, further comprising:

an exhaust nozzle positioned downstream of the detonation chamber, wherein the exhaust nozzle is at least one of a converging/diverging nozzle or a variable area nozzle.

8. The engine of claim 1, further comprising:

a core fuel delivery system in fluid communication with the core inlet path, wherein the core fuel delivery system delivers a first fuel to the core inlet path to create the core air-fuel mixture; and a pilot fuel delivery system in fluid communication with the pilot inlet path, wherein the pilot fuel delivery system delivers a second fuel to the pilot inlet path to create the pilot air-fuel mixture.

9. The engine of claim 8, wherein the core fuel delivery system is upstream of the detonation chamber.

10. The engine of claim 1, wherein the detonation chamber lacks a centerbody.

11. The engine of claim 1, wherein the detonation chamber has a non-circular cross-sectional area.

12. The engine of claim 1, wherein the channel further includes an igniter operable to ignite the pilot air-fuel mixture.

13. The engine of claim 1, wherein the detonation chamber further includes an igniter operable to ignite the core air-fuel mixture.

14. The engine of claim 1, wherein the opening is one of a plurality of openings, the plurality of openings comprising a plurality of circular holes.

15. The engine of claim 1, wherein the opening is one of a plurality of openings, the plurality of openings comprising a plurality of non-circular holes.

16. A method of operating the engine of claim 1, the method comprising:

igniting the pilot air-fuel mixture in the detonation chamber to create the rotating detonation wave; and stabilizing the rotating detonation wave via the channel.

17. The method of claim 16, further comprising:

supplying a first fuel to core air of the engine to create the core air-fuel mixture; and supplying a second fuel to fan bypass air of the engine to create the pilot air-fuel mixture.

18. The method of claim 17, wherein the first fuel is supplied to the core air upstream of the channel.

* * * * *